United States Patent
Poulsen et al.

(10) Patent No.: US 7,033,633 B2
(45) Date of Patent: Apr. 25, 2006

(54) PROCESS OF FORMING A REFRIGERATED DOUGH

(75) Inventors: Charlotte H. Poulsen, Brabrand (DK); Jens F. Sorensen, Aarbus (DK)

(73) Assignee: Danisco A/S, Copenhagen K (DK)

( * ) Notice: Subject to any disclaimer, the term of this patent is extended or adjusted under 35 U.S.C. 154(b) by 432 days.

(21) Appl. No.: 10/181,473

(22) PCT Filed: Jan. 17, 2001

(86) PCT No.: PCT/IB01/00168

§ 371 (c)(1),
(2), (4) Date: Oct. 4, 2002

(87) PCT Pub. No.: WO01/52657

PCT Pub. Date: Jul. 26, 2001

(65) Prior Publication Data

US 2003/0138522 A1    Jul. 24, 2003

(30) Foreign Application Priority Data

Jan. 18, 2000   (GB)   .................................... 0001136

(51) Int. Cl.
*A21D 2/26*    (2006.01)

(52) U.S. Cl. .......................... 426/549; 426/18; 426/653

(58) Field of Classification Search .................. 426/19, 426/21, 27, 549, 653, 18
See application file for complete search history.

(56) References Cited

U.S. PATENT DOCUMENTS 5,306,633 A    4/1994   Gottschalk et al.
5,792,499 A    8/1998   Atwell

FOREIGN PATENT DOCUMENTS

WO   WO 97/26794    7/1997
WO   WO 98/49278    11/1998

OTHER PUBLICATIONS

Debyser et al; "Triticum Zestivum Xylanase Inhibitor Affecting Breadmaking Performance"; Journal of Cereal Science, Academic Press Ltd., vol. 30, No. 1, Jul. 1999, pp. 39-43, XP000925298.
McLauchlan et al; "A Novel Class of Protein from Wheat Which Inhibits Xylanases"; Biochemical Journal, Portland Press, London, GB, vol. 338, No. 2, Mar. 1, 1999, pp. 441-446, XP000925393.
Rouaou et al.; "Evidence for the Presence of a Pentosanase Inhibitor in Wheat Flours"; Journal of Cereal Science, Academic Press Ltd., vol. 28, Jul. 1998, pp. 63-70, XP000925297.
Fincher et al., "Cell walls and their components in cereal grant technology", (1986), pp 207-295; vol. VIII. Pomeranz, Y. ed. Am.Assoc.Cereal.Chem., St. Paul. MN, USA.
Girhammar, "Water soluble non-starch polysaccharides from cereals", (1992), Lund, Sweden.
Cleemput et al., "Identification and characterization of a novel arabinoxylanase from wheat flour", Plant Physiology 115, vol. 4, (1997) pp 1619-1627.
Bonnin et al., "Preliminary characterization of endogenous wheat arabinoxylan-degrading enzymic extracts", Journal of Cereal Science 28 vol. 1, (1998), pp 53-62.
Meuser et al., "Non-starch polysaccharides", Chemistry and Physics of Baking, (1986), pp 42-61.
Rouau et al., "Effect of an enzyme preparation containing pentosanases on the bread-making quality of flours in relation to changes in pentosan properties" Journal of Cereal Science, (1994); pp 259-272.
McCleary, Enzymatic modification of plant polysaccharides, International Journal of Biological Macro Molecules, vol. 8, (1986), pp 349-354.
Paice et al, "A xylanase gene from *Bacillus subtilis*: nucleotide sequence and comparison with B. pumilus gene", Arch. Microbiol. 144, (1986); pp 201-206.
Maat et al., "Xylanases and their application in bakery", Xylans and Xylanases edited by J. Visser et al, (1992), pp 349-360.

*Primary Examiner*—Keith Hendricks
(74) *Attorney, Agent, or Firm*—Nixon & Vanderhye P.C.

(57)   ABSTRACT

A process of forming a refrigerated dough is described. The process comprises admixing cereal flour and water with a protein that can reduce or prevent the enzymatic degradation of arabinoxylan present in the cereal flour.

9 Claims, 2 Drawing Sheets

Figure 1:
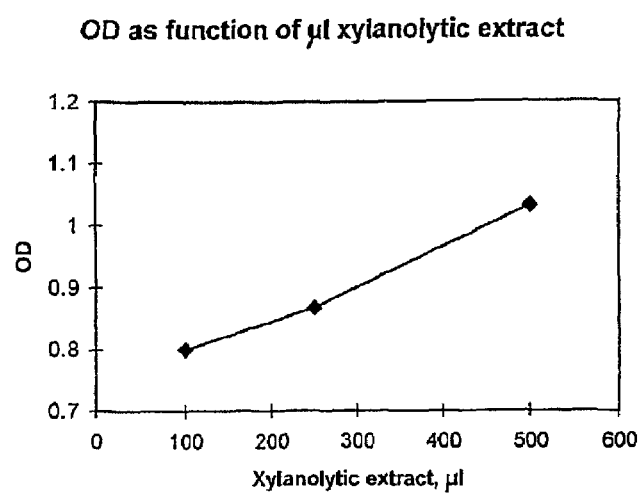

Figure 1. OD increase in xylanase assay as a function of added wheat endogenous xylanolytic extract

SYRUPING DOUGH

Figure 2:
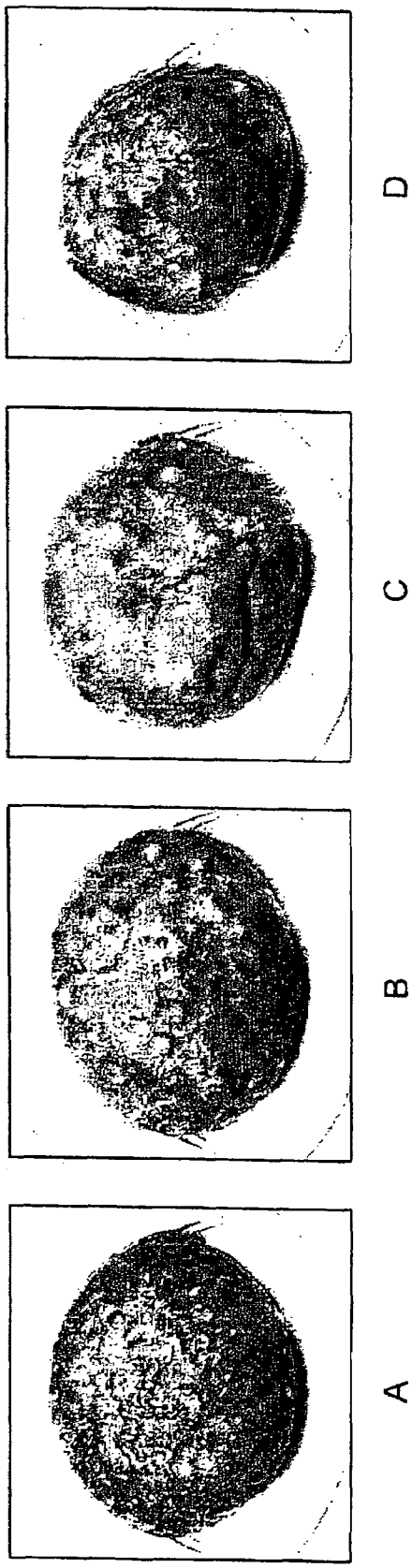

FIGURE 2. DOUGH MADE AS DESCRIBED IN EXAMPLE 3. DOUGH A IS CONTROL DOUGH, DOUGH B CONTAINS 2 TIMES THE NATIVE XYLANASE INHIBITOR LEVEL, DOUGH C CONTAINS 10 TIMES THE NATIVE XYLANASE INHIBITOR LEVEL AND DOUGH D CONTAINS 2% ADDITIONAL XYLAN AND ADDITIONAL WATER.

SEQUENCE LISTING

```
<160> NUMBER OF SEQ ID NOS: 7

<210> SEQ ID NO 1
<211> LENGTH: 35
<212> TYPE: PRT
<213> ORGANISM: Artificial Sequence
<220> FEATURE:
<223> OTHER INFORMATION: N-terminal A chain of wheat flour xylanase
      inhibitor

<400> SEQUENCE: 1

Gly Ala Pro Val Ala Arg Ala Val Glu Ala Val Ala Pro Phe Gly Val
1               5                  10                  15

Cys Tyr Asp Thr Lys Thr Leu Gly Asn Asn Leu Gly Gly Tyr Ala Val
            20                  25                  30

Pro Asn Val
        35

<210> SEQ ID NO 2
<211> LENGTH: 17
<212> TYPE: PRT
<213> ORGANISM: Artificial Sequence
<220> FEATURE:
<223> OTHER INFORMATION: C-terminal A chain of wheat flour xylanase
      inhibitor

<400> SEQUENCE: 2

Lys Arg Leu Gly Phe Ser Arg Leu Pro His Phe Thr Gly Cys Gly Gly
1               5                  10                  15

Leu

<210> SEQ ID NO 3
<211> LENGTH: 21
<212> TYPE: PRT
<213> ORGANISM: Artificial Sequence
<220> FEATURE:
<223> OTHER INFORMATION: N-terminal B chain of wheat flour xylanase
      inhibitor

<400> SEQUENCE: 3

Leu Pro Val Pro Ala Pro Val Thr Lys Asp Pro Ala Thr Ser Leu Tyr
1               5                  10                  15

Thr Ile Pro Phe His
            20
```

-continued

```
<210> SEQ ID NO 4
<211> LENGTH: 31
<212> TYPE: PRT
<213> ORGANISM: Artificial Sequence
<220> FEATURE:
<223> OTHER INFORMATION: Lys-C digested B chain of wheat flour xylanase
      inhibitor

<400> SEQUENCE: 4

Leu Leu Ala Ser Leu Pro Arg Gly Ser Thr Gly Val Ala Gly Leu Ala
1               5                   10                  15

Asn Ser Gly Leu Ala Leu Pro Ala Gln Val Ala Ser Ala Gln Lys
            20                  25                  30

<210> SEQ ID NO 5
<211> LENGTH: 24
<212> TYPE: PRT
<213> ORGANISM: Artificial Sequence
<220> FEATURE:
<223> OTHER INFORMATION: Lys-C digested B chain of wheat flour xylanase
      inhibitor

<400> SEQUENCE: 5

Gly Gly Ser Pro Ala His Tyr Ile Ser Ala Arg Phe Ile Glu Val Gly
1               5                   10                  15

Asp Thr Arg Val Pro Ser Val Glu
            20

<210> SEQ ID NO 6
<211> LENGTH: 13
<212> TYPE: PRT
<213> ORGANISM: Artificial Sequence
<220> FEATURE:
<223> OTHER INFORMATION: Lys-C digested B chain of wheat flour xylanase
      inhibitor

<400> SEQUENCE: 6

Val Asn Val Gly Val Leu Ala Ala Cys Ala Pro Ser Lys
1               5                   10

<210> SEQ ID NO 7
<211> LENGTH: 41
<212> TYPE: PRT
<213> ORGANISM: Artificial Sequence
<220> FEATURE:
<223> OTHER INFORMATION: Lys-C digested B chain of wheat flour xylanase
      inhibitor

<400> SEQUENCE: 7

Val Ala Asn Arg Phe Leu Leu Cys Leu Pro Thr Gly Gly Pro Gly Val
1               5                   10                  15

Ala Ile Phe Gly Gly Pro Val Pro Trp Pro Gln Phe Thr Gln Ser
            20                  25                  30

Met Pro Tyr Thr Leu Val Val Val Lys
            35                  40
```

PROCESS OF FORMING A REFRIGERATED DOUGH

This application is the U.S. national phase of international application PCT/IB01/00168 filed 17 Jan. 2001, which designated the U.S.

BACKGROUND OF THE PRESENT INVENTION

The present invention relates to a process. In particular, the present invention relates to a process of preparing a dough. More in particular, the present invention relates to a process of preparing a refrigerated dough.

BACKGROUND ART

Typically, refrigerated dough comprises wheat flour and water. In this respect, it is similar to other white bread doughs. In the refrigerated dough, the wheat flour contains 2–5% arabinoxylan (AX) (Fincher and Stone, 1986) originating from the endosperm cell walls. AX is a complex non-starch polymer that has a unique capacity to bind water. Girhammer (1992) reports, AXs are capable of binding water in amounts of up to about 10 times their own weight.

Refrigerated dough is a rapidly increasing bread market. In this respect, pre-made dough, prepared by industrial bakeries, can be stored for long time, and fresh baked bread can be produced very easy and rapidly by the end consumer. The whole concept of refrigerated dough, fits well to the developing demands of the consumers—viz: being able to have fresh baked bread independent of opening hours, time to bakery, etc.

However, there is a problem with refrigerated dough. In this regard, refrigerated doughs are known to exhibit syruping. Syruping is a consequence of the deleterious breakdown of AX, and hence a decrease in water holding capacity in the dough. Otherwise expressed, syruping is a lack of water holding capacity as a function of time such as to cause precipitation of liquid to the surface of the dough.

It is believed that the breakdown of the AX, is due to the activity of endogenous xylanases in the wheat flour. Wheat flour contains several enzyme activities capable of modifying the AX (Cleemput, G. et al (1997), Bonnin, E et al (1998)), which give a decrease in molecular weight and hence water holding capacity of the AX in the dough.

Workers have tried to solve the problem of syruping by adding hydrocolloids to the dough. These hydrocolloids bind water and, to some extent, delay syruping. By way of example, reference may be made to U.S. Pat. No. 5,792,499 which describes the addition of xylan to the dough.

However, there are problems associated with adding hydrocolloids to dough. By way of example, they will effect the machinability of the dough, the visco-elastic properties of the dough and the water distribution within the dough.

The present invention seeks to provide a dough that has a reduced, or even no, level of syruping.

SUMMARY ASPECTS OF THE PRESENT INVENTION

The present invention is based on the surprising finding that it is possible to reduce—or even to eliminate—syruping in refrigerated dough by using a protein. This finding is in contrast to the prior art suggestion of the use of hydrocolloids. The finding is surprising as, in some cases, the addition of additional proteins may have been expected to have had an adverse effect on the dough. In particular, it would have been expected that, in some cases, use of an inhibitor of one of the enzymes present in the dough—especially additional amounts of endogenous enzyme inhibitors—would have had a deleterious effect on the resultant dough. However, we have surprisingly found that this is not the case and that it is possible to use proteins to reduce or prevent the enzymatic degradation of arabinoxylan present in cereal flour, in particular wheat flour. Thus, in a preferred aspect, we have surprisingly found that it is possible to reduce or prevent the enzymatic degradation of arabinoxylan present in cereal flour, in particular wheat flour. In a preferred aspect, the present invention relates to the use of an inhibitor of endogenous xylanase in refrigerated dough to prevent syruping. In one preferred embodiment, the present invention relates to the use of an endogenous xylanase inhibitor in refrigerated dough to prevent syruping.

DETAILED ASPECTS OF THE PRESENT INVENTION

According to one aspect of the present invention, there is provided a process of forming a refrigerated dough, the process comprising admixing cereal flour (e.g. wheat flour) and water with a protein that can reduce or prevent the enzymatic degradation of arabinoxylan present in the cereal flour.

The dough may be prepared by mixing the cereal flour with the water initially and then adding the protein. Alternatively, the dough may be prepared by mixing the cereal flour and the protein initially and then adding water. Alternatively, the dough may be prepared by mixing the water with the protein initially and then adding the cereal flour. Combinations of these process steps are also encompassed by the present invention.

The resultant dough may comprise ingredients other than the cereal flour, the water and the protein. For example, the dough may comprise added amounts of one or more of: salt, sugar, fruit, spice(s), enzymes such as xylanase(s), amylase(s), protease(s), oxidase(s), lipase(s), bread improver(s) etc.

According to one aspect of the present invention, there is provided a refrigerated dough prepared by the process of the present invention.

According to one aspect of the present invention, there is provided a bakery product prepared from the process of the present invention or the refrigerated dough of the present invention.

According to one aspect of the present invention, there is provided a refrigerated dough comprising cereal flour, water and a protein that can reduce or prevent the enzymatic degradation of arabinoxylan present in the cereal flour.

According to one aspect of the present invention, there is provided the use of a cereal (e.g. wheat) endogenous xylanase inhibitor to prevent syruping in refrigerated dough.

For ease of reference, these and further aspects of the present invention are now discussed under appropriate section headings. However, the teachings under each section are not necessarily limited to each particular section.

Preferable Aspects

Preferably the protein is an enzyme inhibitor.

Preferably the protein has an inhibitory effect on at least one enzyme that has a deleterious effect on AX.

Preferably the protein is a xylanase inhibitor.

Preferably the xylanase inhibitor is a cereal endogenous xylanase inhibitor.

The cereal endogenous xylanase inhibitor may be obtainable from suitable cereals, such as wheat, rye etc.

Preferably, the xylanase inhibitor is a wheat endogenous xylanase inhibitor.

Preferably, the cereal flour is wheat flour.

Some Advantages

One key advantage of the refrigerated dough of the present invention is that it has a reduced—or even no—level of syruping.

Another advantage of the refrigerated dough of the present invention is that it is easy to prepare.

Another advantage of the refrigerated dough of the present invention is that the dough can be easily tailored to suit specific requirements, simply by adding specific proteins according to the present invention or combinations of specific proteins.

Another advantage of the refrigerated dough of the present invention is that addition of the protein, in particular the cereal endogenous xylanase inhibitor, may not affect one or more of the baking absorption of the flour, the dough mixing properties, the dough handling properties, the dough machinability, nor the water distribution within the dough.

Wheat Flour

The term "wheat flour" as used herein is a synonym for the finely-ground meal of wheat. Preferably, however, the term means flour obtained from wheat per se and not from another grain. Thus, and unless otherwise expressed, references to "wheat flour" as used herein preferably mean references to wheat flour per se as well as to wheat flour when present in a medium, such as a dough.

Protein

An essential feature of the refrigerated dough of the present invention is the presence of a protein that can reduce or prevent the enzymatic degradation of arabinoxylan present in the cereal flour.

The protein may be any suitable protein that can reduce or prevent the enzymatic degradation of arabinoxylan present in the cereal flour The protein may be a protein that has been isolated from a suitable source, or it may have been made synthetically or it may have been prepared by use of recombinant DNA techniques. The protein may also be a mutant or variant of such proteins.

Xylanases

Xylanases have been used in bakery for several years.

Xylanases are inter alia capable of catalysing the depolymerisation of arabinoxylan which may be present in cereal (e.g. wheat)—e.g. an enzyme that is inter alia capable of catalysing the solubilisation of water insoluble pentosan (WIP) and catalysing the depolymerisation of water soluble pentosan (WSP) which may be present in cereal (e.g. wheat).

In this regard, it is known that cereal flour (e.g. wheat flour) contains arabinoxylan originating from the endosperm cell walls. The amount of arabinoxylan in the flour differs depending on the origin of the flour—for example, see Rouau et al, Journal of Cereal Science (1994), 19, 259–272 *Effect of an Enzyme Preparation Containing Pentosanases on the Bread-making Quality of Flour in Relation to Changes in Pentosan Properties;* Fincher and Stone, (1986) *Advances in Cereal Technology,* Vol. VIII (Y Pomeranz, Ed.) AACC, St Paul, Minn., 207–295; and Meuser and Suckow (1986), *Chemistry and Physics of Baking* (J. M. V. Blanchard, P J Frasier and T Gillard, Eds.) Royal Society of Chemistry, London, 42–61. Typically the amount of arabinoxylan can vary from 2–5% ((w/w) based on flour dry weight). Fincher and Stone (1986) report 70% of the polysaccharides in the endosperm cell wall are arabinoxylan. A characteristic feature of arabinoxylan is its ability to bind water. Part of the arabinoxylan is water insoluble pentosan (WIP) and part is water soluble pentosan (WSP). Experimental results have shown a correlation between degradation of WIP to high molecular weight (HMW) water soluble polymers and bread volume.

During the production of a bakery product, it is known that using a xylanase at a proper dosage may result in a more stable dough system (which will typically comprise salt, flour, yeast and water) and a better volume of, for example, raised bread.

In this respect, a good xylanase for increasing bread volume should solubilise WIP giving an increased viscosity in the dough liquid without further degradation of WSP into xylose oligomers. This degradation of WIP into low molecular weight (LMW) WSP is believed to be detrimental for the dough properties and may give rise to stickiness (Rouau et al and McCleary (1986) *International Journal of Biological Macro Molecules,* 8, 349–354).

U.S. Pat. No. 5,306,633 discloses a xylanase obtained from a *Bacillus subtilis* strain. Apparently, this xylanase may improve the consistency and increase the volume of bread and baked goods containing the same.

Another xylanase from *Bacillus subtilis* has been isolated and sequenced (see Paice, M. G., Bourbonnais, R., Desrochers, M., Jurasek, L. and Yaguchi, M. *A xylanase gene from Bacillus subtilis: nucleotide sequence and comparison with B. pumilus gene,* Arch. Microbiol. 144, 201–206 (1986)).

To date, fungal xylanases have been typically used in baking. For example, J Maat et al. (Xylans and Xylanases, edited by J Visser et al, 349–360, *Xylanases and their application in bakery*) teach a β-1,4-xylanase produced by an *Aspergillus niger* var. *awamori* strain. According to these authors, the fungal xylanase is effective in increasing the specific volume of breads, without giving rise to a negative side effect on dough handling (stickiness of the dough) as can be observed with xylanases derived from other fungal or from bacterial sources.

Despite reported beneficial effects of xylanases, we have now found that other benefical effects may be obtained by using inhibitors of xylanases.

In a preferred aspect of the present invention the inhibitor can reduce or prevent the enzymatic degradation of arabinoxylan present in cereal flour.

In a highly preferred aspect of the present invention the inhibitor is a protein that can reduce or prevent the enzymatic degradation of arabinoxylan present in cereal flour.

In a highly preferred aspect of the present invention the inhibitor is a xylanase inhibitor that can reduce or prevent the enzymatic degradation of arabinoxylan present in the cereal flour.

An assay for determining endo-β-1,4-xylanase activity is presented below.

Xylanase Assay (Endo-β-1,4-Xylanase Activity)

Xylanase samples are diluted in citric acid (0.1M)—disodium-hydrogen phosphate (0.2M) buffer, pH 5.0, to obtain approx. optical density (OD)=0.7 in the final assay. Three dilutions of the sample and an internal standard with a defined activity are thermostated for 5 minutes at 40° C. To time=5 minutes, 1 Xylazyme tab (crosslinked, dyed xylan substrate) is added to the enzyme solution. To time=15 minutes (or in some cases longer, depending on the xylanase activity present in the sample) the reaction is terminated, by adding 10 ml of 2% TRIS. The reaction mixture is centrifuged and the OD of the supernatant is measured at 590 nm. Taking into account the dilutions and the amount of xylanase, the activity (TXU, Total-Xylanase-Units) of the sample can be calculated relatively to the standard.

Xylanase Inhibitor

As indicated above, in a preferred aspect of the present invention the agent that can reduce or prevent the enzymatic degradation of arabinoxylan present in the cereal flour is a protein, more preferably a xylanase inhibitor.

The xylanase inhibitor may be any suitable xylanase inhibitor. A suitable assay for screening for suitable xylanase inhibitors is presented in a later section.

By way of example, the xylanase inhibitor may be the inhibitor described in WO-A-98/49278 and/or the xylanase inhibitor described by Rouau, X. and Surget, A. (1998), McLauchlan, R., et al. (1999) and/or the xylanase inhibitor described in UK patent application number 9828599.2 (filed Dec. 23, 1998), UK patent application number 9907805.7 (filed Apr. 6, 1999) and UK patent application number 9908645.6 (filed Apr. 15, 1999).

Xylanase Inhibitor Assay

100 μl of an candidate inhibitor fraction, 250 μl xylanase solution (containing 12 TXU microbial xylanase/ml) and 650 μl buffer (0.1 M citric acid –0.2M di-sodium hydrogen phosphate buffer, pH 5.0) are mixed. The mixture is thermostated for 5 minutes at 40.0° C. At time=5 minutes one Xylazyme tab is added. At time=15 minutes the reaction is terminated by adding 10 ml 2% TRIS. The reaction mixture is centrifuged (3500 g, 10 minutes, room temperature) and the supernatant is measured at 590 nm. The inhibition is calculated as residual activity compared to the blank. The blank is prepared the same way, except that the 100 μl inhibitor is substituted with 100 μl buffer (0.1 M citric acid –0.2 M di-sodium hydrogen phosphate buffer, pH 5.0).

Specific Xylanase Inhibitor

As indicated, a xylanase inhibitor that may be used in accordance with the present invention is the xylanase inhibitor described in UK patent application number 9828599.2 (filed Dec. 23, 1998), UK patent application number 9907805.7 (filed Apr. 6, 1999) and UK patent application number 9908645.6 (filed Apr. 15, 1999).

This endogenous endo-β-1,4-xylanase inhibitor is obtainable from wheat flour. The inhibitor is a di-peptide, having a MW of about 40 kDa (as measured by SDS or MS) and that it has a pl of about 8 to about 9.5.

Sequence analysis to date has revealed that the inhibitor has at least one or more of the sequences presented as SEQ ID No. 1, SEQ ID No. 2, SEQ ID No 3, SEQ ID No. 4, SEQ ID No. 5, SEQ ID No. 6 and/or SEQ ID No. 7.

Thus, the present invention encompasses an endo-β-1,4-xylanase inhibitor which comprises at least one or more of the sequences presented as SEQ ID No. 1, SEQ ID No. 2, SEQ ID No 3, SEQ ID No. 4, SEQ ID No. 5, SEQ ID No. 6 and/or SEQ ID No. 7 or a variant, homologue, or fragment thereof.

The terms "variant" or "homologue" are synonymous with allelic variations of the sequences.

The terms "variant", "homologue" or "fragment" in relation to the inhibitor of the present invention include any substitution of, variation of, modification of, replacement of, deletion of or addition of one (or more) amino acid from or to the sequence providing the resultant amino acid sequence has xylanase inhibitory action, preferably having at least the same activity as an inhibitor that has at least one or more of the sequences presented as SEQ ID No. 1, SEQ ID No. 2, SEQ ID No 3, SEQ ID No. 4, SEQ ID No. 5, SEQ ID No. 6 and/or SEQ ID No. 7. In particular, the term "homologue" covers homology with respect to structure and/or function providing the resultant inhibitor has xylanase inhibitory action, preferably having at least the same activity of an inhibitor that has at least one or more of the sequences presented as SEQ ID No. 1, SEQ ID No. 2, SEQ ID No 3, SEQ ID No. 4, SEQ ID No. 5, SEQ ID No. 6 and/or SEQ ID No. 7. With respect to sequence homology (i.e. sequence similarity or sequence identity), preferably there is at least 75%, more preferably at least 80%, more preferably at least 85%, more preferably at least 90% homology to the sequence shown in the attached sequence listings. More preferably there is at least 95%, more preferably at least 98%, homology to the sequence shown in the attached sequence listings.

In particular, the term "homology" as used herein may be equated with the term "identity". Here, sequence homology with respect to the nucleotide sequence of the present invention and the amino acid sequence of the present invention can be determined by a simple "eyeball" comparison (i.e. a strict comparison) of any one or more of the sequences with another sequence to see if that other sequence has at least 75% identity to the sequence(s). Relative sequence homology (i.e. sequence identity) can also be determined by commercially available computer programs that can calculate % homology between two or more sequences. A typical example of such a computer program is CLUSTAL.

Hence, homology comparisons can be conducted by eye. However, more usually they are conducted with the aid of readily available sequence comparison programs.

These commercially available computer programs can calculate % homology between two or more sequences.

% homology may be calculated over contiguous sequences, i.e. one sequence is aligned with the other sequence and each amino acid in one sequence directly compared with the corresponding amino acid in the other sequence, one residue at a time. This is called an "ungapped" alignment. Typically, such ungapped alignments are performed only over a relatively short number of residues (for example less than 50 contiguous amino acids).

Although this is a very simple and consistent method, it fails to take into consideration that, for example, in an otherwise identical pair of sequences, one insertion or deletion will cause the following amino acid residues to be put out of alignment, thus potentially resulting in a large reduction in % homology when a global alignment is performed. Consequently, most sequence comparison methods are designed to produce optimal alignments that take into consideration possible insertions and deletions without penalising unduly the overall homology score. This is achieved by inserting "gaps" in the sequence alignment to try to maximise local homology.

However, these more complex methods assign "gap penalties" to each gap that occurs in the alignment so that, for the same number of identical amino acids, a sequence alignment with as few gaps as possible—reflecting higher relatedness between the two compared sequences—will achieve a higher score than one with many gaps. "Affine gap costs" are typically used that charge a relatively high cost for the existence of a gap and a smaller penalty for each subsequent residue in the gap. This is the most commonly used gap scoring system. High gap penalties will of course produce optimised alignments with fewer gaps. Most alignment programs allow the gap penalties to be modified. However, it is preferred to use the default values when using such software for sequence comparisons. For example when using the GCG Wisconsin Bestfit package (see below) the default gap penalty for amino acid sequences is −12 for a gap and −4 for each extension.

Calculation of maximum % homology therefore firstly requires the production of an optimal alignment, taking into consideration gap penalties. A suitable computer program for carrying out such an alignment is the GCG Wisconsin Bestfit package (University of Wisconsin, U.S.A.; Devereux et al., 1984, Nucleic Acids Research 12:387). Examples of other software than can perform sequence comparisons include, but are not limited to, the BLAST package (see Ausubel et al., 1999 ibid—Chapter 18), FASTA (Atschul et al., 1990, J. Mol. Biol., 403–410) and the GENEWORKS suite of comparison tools. Both BLAST and FASTA are available for offline and online searching (see Ausubel et al., 1999 ibid, pages 7–58 to 7–60). However it is preferred to use the GCG Bestfit program.

Although the final % homology can be measured in terms of identity, the alignment process itself is typically not based on an all-or-nothing pair comparison. Instead, a scaled similarity score matrix is generally used that assigns scores to each pairwise comparison based on chemical similarity or evolutionary distance. An example of such a matrix commonly used is the BLOSUM62 matrix—the default matrix for the BLAST suite of programs. GCG Wisconsin programs generally use either the public default values or a custom symbol comparison table if supplied (see user manual for further details). It is preferred to use the public default values for the GCG package, or in the case of other software, the default matrix, such as BLOSUM62.

Once the software has produced an optimal alignment, it is possible to calculate % homology, preferably % sequence identity. The software typically does this as part of the sequence comparison and generates a numerical result.

Preferably, sequence comparisons are conducted using the simple BLAST search algorithm provided at the world wide web address: ncbi.nlm.nih.gov/BLAST using the default parameters.

The present invention also encompasses fragments of the presented amino acid sequence and variants thereof presented herein. Suitable fragments will be at least 5, e.g. at least 10, 12, 15 or 20 amino acids in size.

The sequences presented herein may also be modified to contain one or more (e.g. at least 2, 3, 5, or 10) substitutions, deletions or insertions, including conserved substitutions.

Conserved substitutions may be made according to the following table which indicates conservative substitutions, where amino acids on the same block in the second column and preferably in the same line in the third column may be substituted for each other

| ALIPHATIC | Non-polar | GAP |
| | | ILV |
| | Polar-uncharged | CSTM |
| | | NQ |
| | Polar-charged | DE |
| | | KR |
| AROMATIC | | HFWY |
| OTHER | | NQDE |

Bakery Product

The present invention provides a process for preparing a foodstuff—especially a bakery product from a refrigerated dough. Typical bakery (baked) products in accordance with the present invention include bread—such as loaves, rolls, buns, pizza bases etc.—pretzels, tortillas, cakes, cookies, biscuits, crackers etc.

INTRODUCTION TO THE EXAMPLES SECTION

The present invention will now be described, by way of example only, and with reference to:

FIG. 1—which presents a graph; and

FIG. 2—which illustrates doughs.

In more detail:

FIG. 1 is a graph showing OD increase in xylanase assay as a function of added wheat endogenous xylanolytic extract; and FIG. 2 illustrates four doughs made according to Example 3.

Example 1

Purification of Wheat Endogenous Xylanase Inhibitor 2 kg wheat flour (Danish reform, batch 99056) was extracted with water, using a flour:water ratio of 1:2, during 10 minutes of stirring. The soluble endogenous xylanase inhibitor was separated from the flour-water slurry by centrifugation. The extraction and centrifugation was performed at 4° C. The inhibitor was purified from the water extract by the following chromatographic techniques and up-concentration techniques: HPLC-SEC, HPLC-CIEC, rotary evaporation, HPLC-HIC, HPLC-SEC and rotary evaporation. The xylanase inhibitor could be monitored during purification, using the xylanase inhibitor assay described in the above. To determine the amount of inhibitor obtained, the following Inhibitor quantification method was used.

Inhibitor Quantification Method

1 XIU (Xylanase Inhibitor Unit) is defined as the amount of inhibitor that decreases 1 TXU to 0.5 TXU under the conditions described below.

250 µl xylanase solution containing 12 TXU/ml, approx. 100 µl xylanase inhibitor solution and citric acid (0.1M)—di-sodium-hydrogen phosphate (0.2M) buffer, pH 5, to react a reaction volume of 1000 µl is pre-incubated for 5 minutes at 40° C. At t=5 minutes, 1 Xylazyme (Megazyme, Ireland) tablet is added to the reaction mixture. At t=15 minutes the reaction is terminated, by addition of 10 ml 2% TRIS/NaOH, pH 12. The solution is filtered and the absorbency of the supernatant is measured at 590 nm. By choosing several different concentrations of inhibitor in the above assay, it is possible to create a plot of OD versus inhibitor concentration. Using the slope (a) and intercept (b) from this plot and the concentration of the xylanase it is possible to calculate the amount of XIU in a given inhibitor solution (equation 1).

$$((b/2)/-a)/TXU \text{ in assay} \qquad \text{Equation 1}$$

From the endogenous xylanase inhibitor purification, the following inhibitor yield was recovered (Table 1). The inhibitor sample was pure and free from wheat endogenous xylanolytic activities.

TABLE 1

Wheat endogenous xylanase inhibitor recovery after purification.

| Sample | Amount | XIU | XIU, total | Recovery, % |
|---|---|---|---|---|
| Flour | 2000 g | 590/g | 1.180.000 | 100 |
| Purified inhibitor | 90 ml | 4658/ml | 419.220 | 35.5 |

Example 2

Inhibition of Wheat Endogenous Xylanolytic Activities, using Purified Wheat Endogenous Xylanase Inhibitor 5 gram flour (batch 99056, containing 590 XIU/g) was extracted with 15 ml cold water for 10 minutes, by stirring. The soluble xylanolytic enzymes were separated from the flour-water slurry by centrifugation (10 minutes, 4° C., 10000 g). The supernatant contained the extractable xylanolytic enzymes. 12 ml xylanolytic extract was obtained.

Different amount of the xylanolytic extract was incubated with Xylazyme substrate (Megazyme, Ireland) with—and without additional purified wheat endogenous xylanase inhibitor. See detailed experimental set-up below (Table 2). The purified inhibitor contained 1200 XIU/ml. In all trials, the reaction volume of 1000 µl was reached by adding citric acid (0.1M)—di-sodium-hydrogen phosphate (0.2M) buffer, pH 5.0. Incubations was terminated by addition of 5 ml 2% TRIS/NaOH, pH 12 after 6 hours and 30 minutes.

TABLE 2

Experimental set-up for showing inhibition of wheat endogenous xylanolytic activities by addition of purified wheat endogenous xylanase inhibitor.

| Trial | Xylanolytic extract, µl | Purified Inhibitor, µl | Buffer, µl | OD |
|---|---|---|---|---|
| 1 | 100 | 0 | 900 | 0.8 |
| 2 | 100 | 100 | 800 | 0.277 |
| 3 | 250 | 0 | 750 | 0.867 |
| 4 | 250 | 100 | 650 | 0.275 |
| 5 | 500 | 0 | 500 | 1.031 |
| 6 | 500 | 100 | 400 | 0.414 |

The purified wheat endogenous xylanase inhibitor can inhibit the wheat extractable xylanolytic enzymes, very efficiently. The xylanolytic enzymes extracted can produce a linear OD increase in the assay (see FIG. 1).

Example 3

Dough Preparation and Evaluation Using Endogenous Xylanase Inhibitor

Doughs are prepared using the following recipe (Table 3) and flour 2000063.

TABLE 3

Recipe for making dough. Water was added to obtain 500 Brabender Units (BU). Xylan is Birch wood xylan (Sigma).

| Dough | Flour, g | NaCl, g | Xylan, g | Water, g | XIU added | XIU total |
|---|---|---|---|---|---|---|
| A | 50 | 1 | 0 | 28 | 0 | 30000 |
| B | 50 | 1 | 0 | 28 | 30000 | 60000 |
| C | 50 | 1 | 0 | 28 | 270000 | 300000 |
| D | 50 | 1 | 1 | 30 | 0 | 30000 |

Mixing of the above dough gave the following mixing data.

TABLE 4

Farinograph data obtained when mixing doughs described in Table 3.

| Dough | Water absorption, % at 500 BU | Development time, min | Stability, min |
|---|---|---|---|
| A | 56.1 | 1.4 | 9.4 |
| B | 56.0 | 1.5 | 9.6 |
| C | 56.1 | 1.5 | 9.3 |
| D | 60.2 | 9.2 | 17.5 |

The above doughs (Table 3) were made by mixing for 5 minutes in a Farinograph mixer.

Doughs were kept in a sealed container ($CO_2$ atmosphere was applied) for 10 days at 10° C. Doughs were evaluated visually at day 0 and day 10. In Table 5, the results are indicated. Furthermore, results are also visualised in FIG. 2. FIG. 2 clearly shows that the brownish syrup is absent on the dough containing 10 times the xylanase inhibitor level, and only slightly present on the dough containing 2 times the xylanase inhibitor level, compared to the doughs A and D.

TABLE 5

Results from evaluating doughs A to D of Table 3. A score of 1 represents a dry dough surface, and a score of 10 represents a wet and syruped dough surface.

| Dough | Day 0 Syruping score | Day 10 Syruping score |
|---|---|---|
| A | 2 | 10 |
| B | 2 | 4 |
| C | 2 | 2 |
| D | 2 | 9 |

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

REFERENCES

Atwell, W. A. (1996). Method for reducing syruping in refrigerated doughs. U.S. Pat. No. 5,792,499.

Bonnin, E., Goff, A., Saulnier, L., Chaurand, M and Thibault, J. F. (1998). Preliminary characterisation of endogenous wheat arabinoxylan-degrading enzymic extracts. Journal of cereal science. 28. vol. 1. 53–62.

Cleemput, G., Van Laere, K., Hessing, M., Van Leuven, F., Torrekens, S. and Delcour, J. A. (1997). Identification and characterization of a novel arabinoxylanase from wheat flour. Plant Physiol. 115. vol. 4. 1619–1627.

Debyser, W. and Delcour, J. A. (1998). Inhibitors of cellolytic, xylanolytic and beta-glucanolytic enzymes. WO 98/49278.

Fincher, G. B. and Stone, B. A. (1986). Cell walls and their components in cereal grain processing. pp 207–295. In: Advances in cereal science and technology. Vol. VIII. Pomeranz, Y. ed. Am. Assoc. Cereal. Chem., St. Paul. Minn., USA.

Girhammer, U. (1992). Water-soluble non-starch polysaccharides from cereals. PhD dissertation, Lund, Sweden.

McLauchlan, R, Garcia-Conesa, M. T., Williamson, G., Roza, M., Ravestein, P., and MacGregor, A. W. (1999). A novel class of protein from wheat which inhibits xylanases. Biochem. J. 338. pp 441–446.

Rouau, X. and Surget, A. (1998). Evidence for the presence of a pentosanase inhibitor in wheat flour. Journal of cereal science. 28. pp 63–70.

Soerensen, J. F. and Sibbesen, O. (1999). Bacterial xylanase. UK A 9828599.2.

The invention claimed is:

1. A process of forming a refrigerated dough, the process comprising admixing cereal flour and water with a protein that can reduce or prevent the enzymatic degradation of arabinoxylan present in the cereal flour to form a dough, and refrigerating said dough to form said refrigerated dough, wherein the protein is a xylanase inhibitor.

2. A process of forming a refrigerated dough, the process comprising admixing cereal flour and water with a protein that has an inhibitory effect on at least one enzyme that has a degradative effect on arabinoxylan to form a dough, and refrigerating said dough to form said refrigerated dough, wherein the protein is a xylanase inhibitor.

3. A process according to claim 1 wherein said xylanase inhibitor is a cereal endogenous xylanase inhibitor.

4. A refrigerated dough prepared by the process of claim.

5. A bakery product prepared from the process according to claim 1 or from a refrigerated dough prepared by said process.

6. A refrigerated dough comprising cereal flour, water and a protein that can reduce or prevent the enzymatic degradation of arabinoxylan present in the cereal flour, wherein the protein is a xylanase inhibitor.

7. A refrigerated dough according to claim 6 wherein said xylanase inhibitor is a cereal endogenous xylanase inhibitor.

8. A method of preventing syruping in a refrigerated dough comprising cereal flour and water, said method comprising admixing a cereal protein with said cereal flour and said water in a process of forming said dough, wherein the protein is a xylanase inhibitor.

9. A bakery product comprising a dough prepared by a process of claim 1.

* * * * *